United States Patent [19]

White

[11] Patent Number: 4,882,355
[45] Date of Patent: Nov. 21, 1989

[54] NOVEL DIETHANOLAMINE TRIACTIC ACID TRIAMIDES AND METHODS FOR IMPROVING FEED UTILIZATION AND LACTATION IN RUMINANT ANIMALS

[75] Inventor: Alan W. White, Kingsport, Tenn.

[73] Assignee: Eastman Kodak Company, Rochester, N.Y.

[21] Appl. No.: 262,375

[22] Filed: Oct. 25, 1988

Related U.S. Application Data

[62] Division of Ser. No. 81,064, Aug. 3, 1987, Pat. No. 4,800,213.

[51] Int. Cl.$^4$ .................. A61K 31/16; C07C 103/50
[52] U.S. Cl. ............................. 514/616; 564/153
[58] Field of Search ...................... 514/616; 564/153

[56] References Cited

U.S. PATENT DOCUMENTS

| | | | |
|---|---|---|---|
| 4,166,865 | 9/1979 | Sakamoto et al. | 424/285 |
| 4,192,875 | 3/1980 | Veber et al. | 424/256 |
| 4,336,250 | 6/1982 | Scheifinger | 424/177 |
| 4,430,328 | 2/1984 | Scheifinger | 424/177 |
| 4,431,801 | 2/1984 | Celmer et al. | 536/123 |

*Primary Examiner*—Richard L. Raymond
*Assistant Examiner*—Raymond Covington
*Attorney, Agent, or Firm*—Thomas R. Savitsky; William P. Heath, Jr.

[57] ABSTRACT

Novel diethanolaminetriacetic acid triamide compounds such as diethanolaminetriacetic acid tris(N,N-diisobutylamide) (alternatively named 2,2'-[[2-[bis(2-methylpropyl)amino]-2-oxoethyl]nitrilo]bis[2,1-ethanediyloxy]bis[N,N-bis(2-methylpropyl)acetamide]) are disclosed that are useful for improving feed utilization efficiency of ruminants and for improving lactation of lactating ruminants. Also disclosed are novel intermediates for preparation of the triamide compounds.

7 Claims, No Drawings

NOVEL DIETHANOLAMINE TRIACTIC ACID TRIAMIDES AND METHODS FOR IMPROVING FEED UTILIZATION AND LACTATION IN RUMINANT ANIMALS

This is a divisional of application Ser. No. 081,064 filed on Aug. 3, 1987, now U.S. Pat. No. 4,800,213.

FIELD OF THE INVENTION

The invention relates to novel compounds and methods for improving feed utilization and lactation in ruminant animals. In particular, the invention relates to novel diethanolaminetriacetic acid triamides and to methods of improving ruminant feed utilization and lactation by administering one or more of said triamides.

BACKGROUND OF THE INVENTION

It is well established that improvements in feed utilization efficiency in ruminant animals can be achieved by altering the fermentation process which takes place in the rumen. Ruminant animals utilize their food by degrading the carbohydrates contained therein to pyruvate and metabolizing the pyruvate to volatile fatty acids (VFAs) such as acetate, propionate and butyrate. These VFAs are absorbed from the gut and are employed for energy production which can then be channeled into growth, lactation, etc., by the ruminant.

The process of formation of acetate in the rumen is one of the major inefficiencies in the digestive process. Since acetate is made by the degradation of a pyruvate molecule, each molecule of acetate which is produced is accompanied by a one carbon molecule which subsequently results in the formation of methane. Most of the methane produced is lost through eructation. Since butyrate is made from two molecules of acetate, each molecule of butyrate involves the loss to the animal of two molecules of methane, with all of the associated energy.

Thus, the efficiency of carbohydrate utilization (carbohydrates being the major nutritive portion of ruminant animals' feed) can be increased by treatments which encourage the animal to produce propionate rather than acetate or butyrate from carbohydrates. Further, the efficiency of feed use can be effectively monitored by observing the production and concentration of propionate in the rumen. If the animal is making more propionate, it will be found to be using its feed more efficiently. A reduction in the amount of methane produced has also been observed to be a good indication of increased feed efficiency.

In this regard, compounds which increase the amount of propionate produced by a ruminant animal enhance the efficiency of feed utilization and have been observed to provide many beneficial results. For instance, it has been disclosed that administration of certain antibiotics which promote production of propionate can be used to promote growth rates of ruminant animals (see, e.g., Celmer et al., U.S. Pat. No. 4,431,801; Maehr, U.S. Pat. No. 4,218,560). Additionally, propionate-increasing substances have also been helpful in improving milk production in lactating ruminants (e.g., Scheifinger, U.S. Pat. Nos. 4,430,328 and 4,336,250). It is thus highly desirable to develop compounds which can increase the production of propionate in ruminant animals such as cattle, sheep or goats in order to improve feed utilization by the animals which will promote the growth of the animals and also achieve improved lactation as well.

SUMMARY OF THE INVENTION

Novel diethanolaminetriacetic acid triamide compounds are provided which are useful in improving the feed utilization efficiency in ruminant animals such as cows, sheep or goats. The novel triamides also improve lactation in lactating ruminant animals. A method of increasing the efficiency of feed utilization is also provided which comprises administering to ruminant animals an effective amount of one or more triamide compounds of the present invention. Also included is a method for improving lactation in lactating ruminants comprising administering a lactation improving amount of one or more triamide compounds of the present invention. As used herein, the term "effective amount" refers to that amount of one or more compounds of the invention, when administered to a ruminant animal, that is sufficient to increase the growth rate and/or feed conversion efficiency of the treated ruminant animals without resulting in any significant adverse side effect; the term "lactation improving amount" refers to that amount of one or more compounds of the invention, when administered to a lactating ruminant, that is sufficient to cause an observable improvement in milk production without resulting in any significant adverse side effects.

DETAILED DESCRIPTION OF THE INVENTION

The triamide compounds of the present invention are of the following formula:

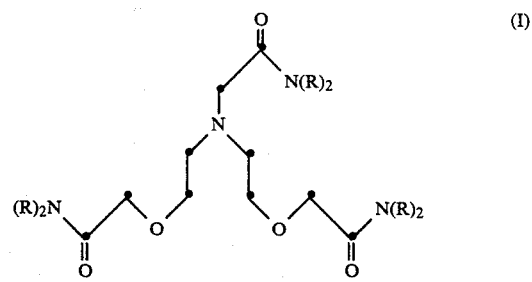

wherein each R may be the same or different and represents a straight or branched chain alkyl group having one to six carbon atoms. The physiologically acceptable salts of the triamide compounds are also within the scope of the invention. Preferably, R will be a group having three to five carbon atoms, such as tert-butyl, n-butyl, isopropyl or isobutyl. Most preferably, R will be isobutyl, and the preferred compound of the present invention will be diethanolaminetriacetic acid tris (N,N-diisobutylamine).

The triamide compound of the present invention can be prepared by adding to a suspension of NaH in dimethoxyethane at about 0° C. a diolamide having the formula:

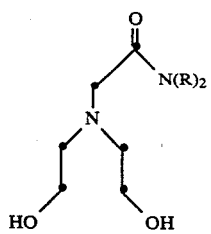
(II)

wherein R is as disclosed above in Formula I. To this suspension is added a chloroamide of the formula:

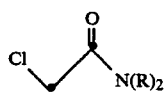
(III)

wherein R is as described above. The reaction mixture is heated to reflux, a drop of water is added, and the solvent is removed. The remaining organic residue layer is washed and concentrated to give the desired triamide in the form of an oil.

The chloroamide (III) can be prepared by reaction of chloroacetyl chloride and the appropriate amine in an inert solvent such as diethyl ether. This reaction is illustrated as follows:

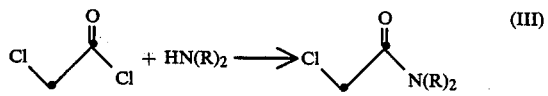
(III)

wherein R is as described above. The diolamide (compound of Formula II) is novel and is therefore also within the scope of the present invention.

The dichloroamide (II) can be prepared by heating a mixture of diethanolamine, the chloroamide (III) and a base such as triethylamine (Et₃N) in an inert solvent such as dimethoxymethane (DME). This reaction is illustrated as follows:

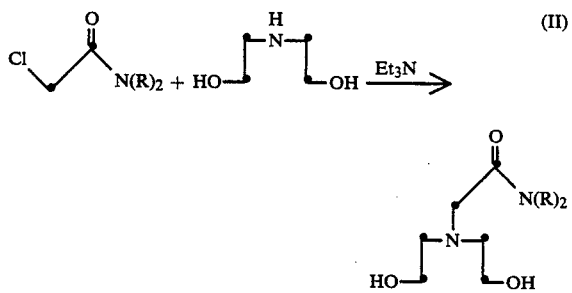
(II)

wherein R is as described above.

The salts of the compounds of this invention are physiologically acceptable salts derived from physiologically acceptable acids. Such physiologically acceptable acids include inorganic acids, e.g., hydrochloric acid, nitric acid, phosphoric acid, sulfuric acid, hydrobromic acid, hydroiodic acid, nitrous acid, phosphorous acid, and the like, as well as organic acids, such as aliphatic mono- or dicarboxylic acids, phenyl-substituted alkanecarboxylic acids, hydroxyalkanecarboxylic acids or alkanedicarboxylic acids, aromatic acids, aliphatic or aromatic sulfonic acids, and the like.

Physiologically acceptable salts of these acids include therefore, for example, the sulfate, pyrosulfate, bisulfate, sulfite, bisulfite, nitrate, phosphate, monohydrogen phosphate, dihydrogen phosphate, metaphosphate, pyrophosphate, chloride, bromide, iodide, fluoride, acetate, propionate, decanoate, caprylate, acrylate, formate, isobutyrate, caproate, heptanoate, propionate, malonate, succinate, suberate, sebacate, fumarate, maleate, mandelate, butyne-1,4-dioate, hexyne-1,6-dioate, benzoate, chlorobenzoate, methylbenzoate, dinitrobenzoate, hydroxybenzoate, methoxybenzoate, phthalate, terephthalate, benzenesulfonate, toluenesulfonate, chlorobenzenesulfonate, xylenesulfonate, phenylacetate, phenylpropionate, phenylbutyrate, citrate, lactate, beta-hydroxybutyrate, glycollate, malate, tartrate, methanesulfonate, propanesulfonate, naphthalene-1-sulfonate, naphthalene-2-sulfonate, and the like.

The salts of the triamide of the present invention can be prepared according to procedures commonly employed for the preparation of anionic salts. For example, the free base form of a triamide compound is dissolved in a suitable solvent, and an aqueous or organic solution of the desired acid is added to the triamide solution. The triamide anionic salts can be isolated by filtration and recrystallization or by evaporation of the solvent and purification.

In the present invention, an effective amount of triamide compound is administered to a ruminant animal in order to improve the efficiency of feed utilization by the animal. It is well established that the administration of substances which improve feed utilization efficiency through increases in propionate production also acts to improve growth rates in ruminant animals. The improved growth rates result from the additional energy made available by the more efficient processing of feed. Therefore the feed utilization method of the invention also encompasses growth promotion activity.

It has been further established that propionate-increasing compounds which improve feed utilization efficiency can also be effective in increasing milk production in lactating ruminant animals. In the lactating ruminant, energy for lactation is often the most limiting factor in milk production, and improvements in feed utilization efficiency often provide the energy needed for increased lactation. However, improving feed utilization by increasing the animal's production of propionate will not always ensure that the milk produced by the lactating ruminant will be of sufficient quality. In milk production, acetate is required in order to synthesize milk fat, while propionate is utilized to produce glucose, and has very little effect on the milk fat produced. In addition, butyrate is degraded into acetate units and then it too can be used in long chain fatty acid synthesis producing the milk fat.

Accordingly, in order to increase milk production in lactating ruminants it is necessary to increase production of propionate, but not at the expense of significant decreases in acetate or butyrate production. Significant reductions in acetate and butyrate production result in a milk product of reduced milk fat content, rendering the milk less economically desirable in the United States (at the present time). It is necessary, therefore, that a compound desirable for use in promoting lactation be one that improves propionate production without significantly lowering acetate and butyrate levels.

The triamide compounds of the present invention provide a significant increase in propionate levels without causing a significant decrease in acetate or butyrate levels, and thus can be used to promote lactation in lactating ruminants. A method of improving lactation in ruminants is thereby provided which comprises administering to lactating ruminant animals a lactation improving amount of one more triamide compounds of the present invention. The administration of the triamide(s) may be direct, or a composition for promoting lactation may be prepared which comprises a lactation-promoting amount of the triamide of Formula I and an inert carrier.

It is not desired to be bound by any particular mechanism or theory; however, the triamide compounds of the present invention are believed to function by selectively inhibiting the growth of a number of species of bacteria which are commonly found in the rumen of ruminant animals. When included in a growth medium designed to support the growth of pure rumen bacterial species, one or more triamides inhibit growth of microorganisms such as *Ruminococcus flavefaciens, Butyrivibrio fibrisolvens, Streptococcus bovis, Bacteroides ruminicola* and the like. In contrast, organisms such as *Selenomonas ruminantium* usually are practically unaffected. In general, the triamide compounds of the present invention seem more active against gram-positive bacteria than gram-negative bacteria.

The triamide compounds of the present invention can be administered to increase feed utilization efficiency of ruminants in any way which ensures that the animals receive an effective amount of one or more of the desired compounds. It is preferred that one or more compounds be administered orally and at an effective amount of from about 0.2 to about 100 milligrams (mg) per kilogram (kg) of ruminant body weight per day. It is particularly preferred that the effective amount is between about 1 to about 10 mg/kg of body weight per day of one or more triamide compounds of the present invention.

The triamide compounds of the present invention can be administered to improve lactation of lactating ruminants in any way which ensures that the animals receive a lactation improving amount of one or more of the desired compounds. A lactation improving amount is typically that amount that results in an increase in the volume of milk produced by about 2 to about 15 percent relative to untreated animals. It is preferred that one or more compounds be administered orally and at a lactation improving amount of from about 0.2 to about 100 mg per kg of ruminant body weight per day. It is particularly preferred that the lactation improving amount is between about 1 and about 10 mg/kg of body weight per day of one or more triamide compounds of the invention.

The exact effective amount and/or lactation improving amount of one or more triamides to be employed will vary depending upon factors such as species of animal, or the size, weight, age and health of the animal. In particular cases, the concentration can be determined by conventional dose titration techniques.

The most practical way to administer the triamide compound of the present invention is to add an effective amount (or lactation improving amount) of one or more triamides or physiologically acceptable salts thereof into the animal's feed. This can be done by directly adding a desired amount of the triamide(s) to the feed supply, or by first forming the compound(s) into a premix composition for subsequent addition to the feed. Such a composition preferably comprises one or more triamide compounds of Formula I above, along with an inert carrier, the amount of triamide(s) being sufficient to result in increased feed utilization and/or improved lactation in an appropriate ruminant animal upon administration to said animal. Suitable carriers include ground corn, barley, soybean meal, wheat, soy flour, or any similar low-priced, edible material. It is desired that the amount of one or more triamide compounds used in the composition be sufficient to comprise from about 5 to about 1000 parts per million in the animal feed. It is particularly preferred that the triamide comprises from about 30 to about 300 parts per million of the ultimate animal feed.

The form of the additive to the feed is not crucial, and alternative forms for administering the triamide compound may be employed. For instance, the compound can be incorporated into tablets, drenches, salt blocks, paste, boluses, or capsules and doped to the animals. Formulation of the compounds in such dosage forms can be accomplished by means of methods well known in the veterinary pharmaceutical art. Each individual dosage unit should contain a quantity of the compound which has a direct relation to the proper daily dose for the animal to be treated, as discussed above.

The following examples are provided in order to further illustrate the present invention and should not be construed as limiting the invention in any way.

EXAMPLE 1

Preparation of Chloroacetic Acid, N,N-dissobutylamide

To a suspension of diisobutylamine (110 g, 149 mL), sodium carbonate (80 g) and ether (400 mL) at $-10°$ C. was added chloroacetyl chloride (85 g, 0.75 mol). The reaction mixture was maintained below room temperature during the addition. The mixture was stirred for 45 minutes after the addition was complete. The solid was removed by filtration, and the filtrate was concentrated resulting in a residue. The residue was dissolved in methylene chloride, extracted with 1N HCl followed by dilute sodium carbonate and dried over solid sodium sulfate which resulted in an aqueous and organic layer. Concentration of the organic layer afforded 80.8 g of a light yellow liquid. The NMR spectrum of this light yellow liquid was consistent with the desired product and indicated that the compound was >95% pure.

EXAMPLE 2

Preparation of Diethanolamineacetic Acid, N,N-diisobutylamide

A mixture of diethanolamine (1.15 g, 0.011 mol), chloroamide 3 (2.0 g, 0.01 mol), triethylamine (0.011 mol) and dimethoxyethane (20 mL) was heated under reflux for 24 hours. The solvent was removed, and the residue was partitioned between 1N HCl and methylene chloride. The aqueous layer was basified and extracted with ethyl acetate (heptane would not extract the product). The organic layer was concentrated to give 2.0 g of a colorless oil. The FDMS, NMR spectrum, and the infrared spectrum of this oil were consistent with the desired product.

EXAMPLE 3

Preparation of Diethanolaminetriacetic Acid Tris(N,N-diisobutylamide)

To a suspension of NaH (0.004 mol., 0.16 g) in dimethoxyethane (10 mL) at 0° C. was added a diolamide (0.55 g, 0.002 mol) having the formula:

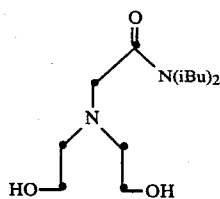

wherein iBu represents isobutyl. To this mixture at room temperature was added a chloroamide (0.0042 mol, 0.86 g) having the formula:

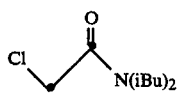

wherein iBu is isobutyl. The reaction mixture was then heated to reflux for 45 minutes. A drop of water was added, and the solvent was removed. The residue was partitioned between 1N HCl and methylene chloride. The organic layer was washed with aqueous sodium carbonate and concentrated to afford 1.3 g of an oil. The resulting product was diethanolaminetriacetic acid tris(N,N-diisobutylamide) having the formula:

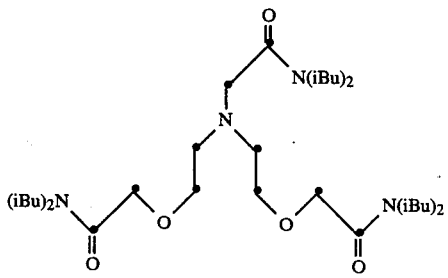

This compound can be alternatively named 2,2'-[[2-[bis(2-methylpropyl)amino]-2-oxoethyl]nitrilo]bis[2,1-ethanediyloxy]bis[N,N-bis(2-methylpropyl)acetamide]. The structure was confirmed by field desorption mass spectrometry (FDMS), NMR spectroscopy, and infrared spectroscopy of the product.

EXAMPLE 4

Effect of Triamide Compound on Rumen Bacterial Growth

The triamide compound of Example 3 above was placed in a growth culture medium of five rumen bacterial species, and growth of the treated cultures was monitored and compared with growth in control media. The results are presented in Table 1 below. The triamide compound of the present invention prevented the growth of *R. flavefaciens* and *B. fibrisolvens*. In addition, the growth of *S. bovis* and *B. ruminicola* was inhibited. The growth of *S. ruminantium* was almost unaffected by the triamide. In general, the triamide appeared to be more active against gram-positive bacteria than gram-negative bacteria.

TABLE 1

RESPONSES OF BACTERIA TO TREATMENT WITH TRIAMIDE

| BACTERIA | | $OD_{660}$[1] | $SD$[2] | RESPONSE[3] |
|---|---|---|---|---|
| *Ruminococcus* | control | 1.131 | 0.033 | 0 |
| *flavefaciens* | w/triamide | −0.008 | 0.008 | 101 |
| *Butyrivibrio* | control | 1.813 | 0.073 | 0 |
| *fibrisolvens* | w/triamide | −0.033 | 0.009 | 102 |
| *Streptococcus* | control | 1.694 | 0.051 | 0 |
| *bovis* | w/triamide | 0.168 | 0.079 | 90 |
| *Bacteroides* | control | 1.648 | 0.011 | 0 |
| *ruminicola* | w/triamide | 0.116 | 0.071 | 93 |
| *Selenomonas* | control | 1.704 | 0.049 | 0 |
| *ruminantium* | w/triamide | 1.343 | 0.092 | 21 |

[1]Each value is the mean of triplicate samples.
[2]SD is the standard deviation
[3]Responses represent inhibition of growth as a percent of the controls and are calculated as follows: Response = 100 × (1-(experimental optical density at 660 nanometers ($OD_{660}$)/control $OD_{660}$))

EXAMPLE 5

Fermentation Experiments

Rumen bacterial suspensions were prepared using rumen fluid obtained from a cannulated steer. The final bacterial suspensions comprised a growth medium which included 65 mL of centrifuged rumen fluid plus 65 mL of deionized water. Various levels of the triamide (of Example 3) from 1 mg/mL solutions or suspensions in methanol were added to 50-mL vials. The methanol was evaporated, an 0.4 g of chopped, dried alfalfa (sieved, 1 mm mesh) was added to each vial. The final bacterial suspensions obtained as described above were added to the vials, 20 mL of suspension per vial, and the suspensions were incubated for 20 hours with an aerobic $CO_2$ atmosphere, shaking at 39° C.

The suspensions were then processed for determination of volatile fatty acids (VFA). The VFAs were determined by the following procedure. After filtration of the VFA sample through 0.2 micron filters to remove particulate matter, samples were transferred to 2-mL vials. The VFA concentrations of the samples were determined by GLC, using a Hewlett Packard (HP) 5890A gas chromatograph, equipped with an HP 3392A Integrator and an HP 7672A Automatic sampler. The column was a 530-micron Carbowax 20M megabore capillary column, HP No. 19095-121. The chromatograph was operated isothermally at 105° C., with the detector and injection port set at 200° C., a flow rate of 17 cc/minute (helium carrier gas), an attenuation of 6, threshold setting of 5, peak width of 0.01, area reject of 10000, and a range setting of 0. Total run time was 8 minutes. After about 300 samples had been run on the column, some peak resolution was lost. To correct for the loss of resolution, the carrier gas flow was reset to 14 cc/minute and the oven temperature was reset to 100° C. Resolution and peak areas from standard solutions indicated that no adjustment of peak area was necessary due to the changes. The results of the VFA determinations are presented in Table 2.

The results indicated that the triamide compound was responsible for an increase in the level of propionate in the rumen bacterial suspension, and this increase was greater with a larger dosage of the triamide. In addition, there were slight, but statistically significant decreases in acetate and butyrate levels.

TABLE 2

VFA CONCENTRATIONS IN TREATED
BACTERIAL SUSPENSIONS
Concentrations of VFAs (millimoles per liter)
SD = Standard Deviation

| Micro-grams of Triamide per mL | Ace-tic | SD | Prop-ionic | SD | Buty-ric | SD | Total VFA | SD |
|---|---|---|---|---|---|---|---|---|
| 0 | 50.1 | 0.9 | 19.7 | 0.3 | 5.1 | 0.1 | 74.9 | 1.3 |
| 10 | 52.3 | 1.0 | 21.3 | 0.4 | 5.2 | 0.2 | 78.8 | 1.5 |
| 20 | 48.1 | 1.3 | 20.2 | 0.7 | 5.1 | 0.2 | 73.4 | 2.2 |
| 40 | 46.4 | 1.7 | 22.1 | 0.9 | 4.4 | 0.2 | 72.9 | 2.8 |
| 80 | 43.0 | 3.4 | 24.8 | 2.0 | 3.7 | 0.4 | 71.5 | 5.8 |
| 160 | 33.1 | 4.1 | 26.0 | 2.6 | 1.9 | 0.3 | 61.0 | 7.0 |

EXAMPLE 6

Adaptation Experiments

The objective was to determine the long-term effects of the triamide compound on fermentation by bacterial suspensions originally obtained from the rumen of a rumen-cannulated steer. A growth medium was prepared using 65 mL of centrifuged rumen fluid plus 65 mL of distilled water. The triamide (of Example 3) was added as 1 mg/mL solutions or suspensions in methanol to 20-mL vials for a nominal concentration of 50 mg/mL.

The methanol was evaporated and 0.2 g of chopped dried alfalfa (sieved, 1 mm mesh) was added to each vial. Rumen-simulating medium was added to each vial, and the vials were frozen until needed. Enough vials were prepared each time for one week of the adaptation experiment.

On the first day, rumen contents were obtained from the rumen of a rumen-cannulated steer and blended. The blended rumen contents were added to vials containing the experimental treatments, 3.0 mL per vial (final volume was 15 mL). All treatments were performed in duplicate. The vials were sealed, with an anaerobic $CO_2$ atmosphere, and incubated (shaking) at 39° C. After incubation for 24 hours, 3-mL volumes of the suspensions were removed and transferred, by syringe and needle, to prewarmed (39° C.) vials containing the same medium and the same experimental chemical, as were in the original vials. The incubation was repeated, so that the each day's vials provided the inocula for the next day of adaptation. The daily transfers were continued for six weeks.

Every day for the first week, and on alternating days of the remaining five weeks, the volume of gas that was produced in the vials was measured as follows: 100-mL serum vials were filled with water. Stoppers were fitted tightly into the tops of the vials, and needles were inserted through the stoppers. Tubing was connected to one of the needles, so that water could pass from the vial into a graduated cylinder. Another section of tubing, with a needle at the other end, was connected to the second needle. To measure gas production, the second needle was inserted through the stopper of the fermentation vial. The gas phase in the fermentation vial, which was under pressure because of the gas that was produced during the fermentation, passed through the tubing, and forced water out of the water-filled vial, and into the graduated cylinder. The volume of water that passed into the graduated cylinder was then measured.

A gas chromatographic (GC) method was employed to quantitate methane and hydrogen accumulation. Vials were stored in ice to prevent additional gas production while the gases in other samples were being measured. A 1-inch, 23-gauge needle, attached to a 1-cc tuberculin syringe, was flushed with the gas phase from the fermentation vials, and was then used to remove samples of gas from the vials. Samples (0.5 cc) of the gas were then injected into the GC. The GC was a Varian Model 3700, equipped with a Hewlett-Packard 5890A integrator. The oven was operated at 145° C. Supelco I-2579 100/120 Carbosieve II molecular sieve, packed in a stainless-steel ⅛ inch OD, 10-foot-long column, was employed for separation of gases. Helium was the carrier gas, flowing at a rate of 30 cc/minute. A thermal conductivity detector was used so that all gases could be measured, at a temperature of 100° C., with a filament temperature of 140° C. The injector temperature was 160° C. The signal analysis settings were changed for the individual gases, because of the wide differences in gas concentrations and detector sensitivity to the gases. The attenuations were set for the individual gases as follows: hydrogen, −5; nitrogen/oxygen (co-elution), 2; methane, −2; carbon dioxide, 2. Threshold settings were as follows: hydrogen, −1; all other gases, 0. Peak width settings were as follows: hydrogen, 0.04; all remaining gases, 0.16. Hydrogen eluted at 0.85 minutes, nitrogen/oxygen eluted at 1.91 minutes, methane eluted at 4.75 minutes, and carbon dioxide eluted at 8.29 minutes. A standard was employed containing 1% hydrogen, 1% oxygen, 1% methane, and 1% carbon dioxide, in nitrogen. Because small amounts of air mixed into the syringe during the sampling procedure, the amount of nitrogen/oxygen present in the GC run was used to correct for leakage (For example, if the analysis indicated the presence of 10% air, the values for methane and hydrogen were divided by 0.9). Moles of gases produced were calculated using the percentages of each gas (by volume), the total volume of gas, and Boyle's gas law. Because the bulk gas was $CO_2$, the measurement of $CO_2$ using the GC was not accurate, but the measurement of total gas volume, minus the proportions of hydrogen and methane, provided an estimate of $CO_2$ production.

During the first week, the gas volumes and the proportions of individual gases were measured on the same days. During subsequent weeks, the two measurements were performed on opposite days, in order to speed up the procedure and prevent unnecessary contamination of the gas phase with air. For the computed values for individual gases, the gas volumes produced on one day were used for calculation of the molar amounts of the gases, based on the GC data for the next day. Weekly averages for all values were calculated for this report. The suspensions were then processed for determination of volatile fatty acids (VFA), and for determination of lactic acid, and the acids were measured by GC, as described earlier. The results are presented in Tables 3 and 4.

The results again indicated that the triamide compound caused an increase in the production of propionate as well as a decrease in the amount of methane produced. There was also a slight decrease in the amount of butyrate produced, and no significant change in the level of acetate produced. Since propionate is a more efficient source of energy for the ruminant animal than acetate or butyrate, greater feed efficiency will be the result of adding the triamide of the present invention to the feed of a ruminant animal. The observed reduction in the amount of methane produced is also a good indication of increased efficiency. Additionally, because the reduction in the production of acetate will only be slight (it may or may not be measurable), there should be no significant change in the composition (fat content) of the milk produced when the triamide is fed to a lactating ruminant in order to improve milk production.

TABLE 3
EFFECT OF TRIAMIDE ON FERMENTATION GAS PRODUCTION

1. Control Suspension

| Week of Adaptation | Micro Moles of $CO_2$ | SD | Micro Moles of Methane | SD | Micro Moles of Hydrogen | SD | Volume of Gas cc Per Vial | SD |
|---|---|---|---|---|---|---|---|---|
| 1 | 901 | 03 | 76 | 45 | 0 | 0 | 28.6 | 2.0 |
| 2 | 880 | 65 | 203 | 23 | t | 0 | 31.1 | 1.2 |
| 3 | 903 | 28 | 159 | 11 | t | 0 | 30.6 | 0.8 |
| 4 | 898 | 74 | 144 | 38 | 0 | 0 | 30.2 | 2.6 |
| 5 | 779 | 23 | 97 | 4 | t | 0 | 26.1 | 0.6 |
| 6 | 708 | 13 | 90 | 2 | t | 0 | 24.3 | 0.4 |

2. Suspension With Triamide

| Week of Adaptation | Micro Moles of $CO_2$ | SD | Micro Moles of Methane | SD | Micro Moles of Hydrogen | SD | Volume of Gas cc Per Vial | SD |
|---|---|---|---|---|---|---|---|---|
| 1 | 888 | 106 | 56 | 31 | 0 | 0 | 27.8 | 2.4 |
| 2 | 887 | 40 | 165 | 21 | t | 0 | 30.4 | 0.5 |
| 3 | 958 | 91 | 140 | 15 | t | 0 | 31.5 | 0.6 |
| 4 | 933 | 38 | 137 | 17 | 0 | 0 | 30.8 | 1.2 |
| 5 | 878 | −36 | 105 | 7 | t | 0 | 28.8 | 1.0 |
| 6 | 803 | 9 | 98 | 5 | t | 0 | 26.8 | 0.4 |

Values are the amounts of the gases produced per vial of suspension per day, as weekly means (duplicate treatments, 2 to 5 determinations per week). SD = standard deviation; t = trace (too small to measure).

TABLE 4
EFFECT OF TRIAMIDE ON VFAs

1. Control Suspension

| Week of Adaptation | Acetic Acid Millimolar | SD | Propionic Acid Millimolar | SD | Butyric Acid Millimolar | SD |
|---|---|---|---|---|---|---|
| 1 | 34.2 | 6.4 | 9.5 | 3.2 | 4.3 | 1.1 |
| 2 | 32.0 | 5.5 | 10.7 | 2.7 | 4.8 | 1.2 |
| 3 | 36.7 | 3.3 | 11.0 | 2.3 | 4.9 | 1.3 |
| 4 | 40.5 | 2.7 | 13.2 | 1.7 | 6.5 | 0.5 |
| 5 | 41.4 | 1.5 | 12.7 | 0.5 | 6.5 | 0.3 |
| 6 | 27.9 | 1.7 | 6.7 | 0.5 | 3.0 | 0.2 |

2. Suspension With Triamide

| Week of Adaptation | Acetic Acid Millimolar | SD | Propionic Acid Millimolar | SD | Butyric Acid Millimolar | SD |
|---|---|---|---|---|---|---|
| 1 | 30.6 | 4.8 | 8.9 | 3.3 | 3.1 | 1.0 |
| 2 | 35.7 | 8.5 | 12.6 | 5.2 | 3.6 | 1.6 |
| 3 | 41.6 | 6.2 | 17.4 | 2.8 | 4.5 | 0.7 |
| 4 | 39.9 | 4.2 | 15.4 | 2.9 | 4.9 | 0.8 |
| 5 | 45.3 | 3.5 | 18.2 | 1.6 | 6.1 | 0.6 |
| 6 | 24.0 | 8.3 | 7.7 | 1.1 | 2.4 | 0.3 |

Values are the means for each week (duplicate samples, with two to five measurements taken per week). Concentrations are given as millimolar amounts present in the fermentation mixture.

What is claimed is:

1. A method for improving lactation in lactating ruminants which comprises administering to said lactating ruminants a lactation improving amount of one or more compounds of the formula:

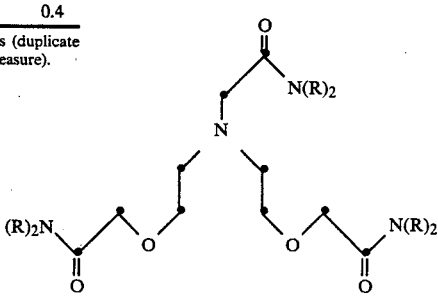

wherein each R may be the same or different and represents a straight or branches chain alkyl group of one to six carbon atoms, or the physiologically acceptable salts thereof.

2. A method according to claim 1 wherein said compound is administered orally.

3. A method according to claim 1 wherein said lactation improving amount is from about 0.2 to about 100 mg/kg of body weight of the animal treated per day.

4. A method according to claim 1 wherein said lactation improving amount is from about 1 to about 10 mg/kg of body weight of the animal treated per day.

5. A method according to claim 1 wherein R contains three to five carbon atoms.

6. A method according to claim 1 wherein R is selected from the group consisting of tert-butyl, n-butyl, isobutyl, and isopropyl.

7. A method according to claim 1 wherein R is isobutyl.

* * * * *